(Model.)
A. S. SEAMAN.
KNIFE FOR CUTTING OIL CLOTH.
No. 318,211. Patented May 19, 1885.
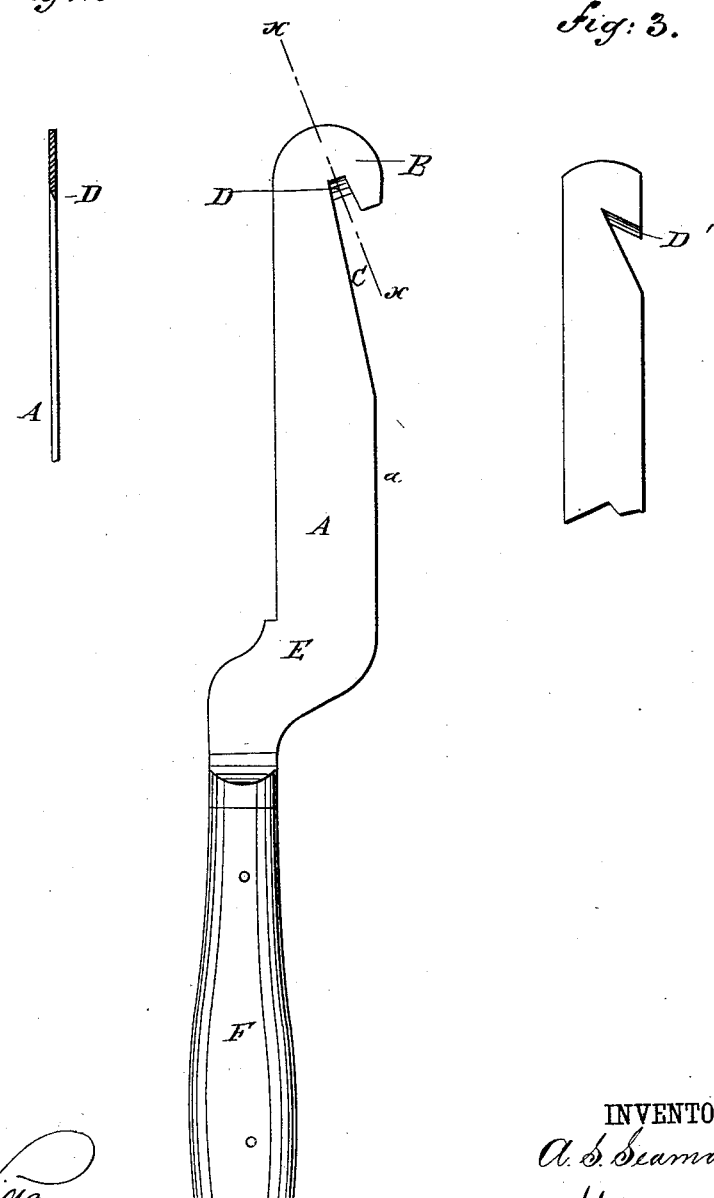
WITNESSES:
Chas. Nida
C. Sedgwick
INVENTOR:
A. S. Seaman
BY Munn & Co
ATTORNEYS.

UNITED STATES PATENT OFFICE.

ALFRED S. SEAMAN, OF FRACKVILLE, PENNSYLVANIA.

KNIFE FOR CUTTING OIL-CLOTH.

SPECIFICATION forming part of Letters Patent No. 318,211, dated May 19, 1885.

Application filed July 12, 1884. (Model.)

*To all whom it may concern:*

Be it known that I, ALFRED S. SEAMAN, of Frackville, in the county of Schuylkill and State of Pennsylvania, have invented a new and Improved Oil-Cloth Knife, of which the following is a full, clear, and exact description.

The object of my invention is to provide a new and improved knife for facilitating the cutting and trimming of oil-cloth, leather, pasteboard, or other like or similar material.

The invention consists in the construction and arrangement of parts, as will be hereinafter described and claimed.

Reference is to be had to the accompanying drawings, forming part of this specification, in which similar letters of reference indicate corresponding parts in all the figures.

Figure 1 is a side view of my improved knife. Fig. 2 is a cross-sectional view on the line $x\ x$, Fig. 1. Fig. 3 is a side view of a modification of the head of the blade.

The blade A is provided at its free end with a hook, B, the outer edge of which is parallel and in line with the edge $a$ of the blade A. The hook forms a recess, C, in the edge of the blade, the edge of the said recess being beveled, and at the upper end of the recess a cutting-edge, D, is formed behind the prong of the hook, the cutting-edge being about at right angles to the beveled edge of the recess C.

If desired, the cutting-edge D can be formed on the inner edge of the prong of the hook, as shown in Fig. 3.

The blade A is provided with a bend, E, at the handle F, the said handle being some distance above the edge $a$ of the blade, so that when the edge $a$ rests on the floor or a table the handle F will be raised sufficiently from the floor or table to prevent the knuckles of the hand from coming in contact with the floor or table and being chafed.

The knife is used in the following manner: It is placed upon the article—such as oil-cloth, leather, &c.—to be cut in such a manner that the edge $a$ rests upon the said article, and the edge of the article to be cut will be presented to the cutting-edge D. If the implement is now drawn in the direction toward its handle, the edge $a$ slides upon the oil-cloth or other article to be cut and the cutting-edge D cuts the said article.

Having thus described my invention, what I claim as new, and desire to secure by Letters Patent, is—

1. As an improved article of manufacture, a knife for cutting oil-cloth, substantially as herein shown and described, and consisting of a blade provided with a cutting-hook at the free end and with a bend at the handle end, the bend extending in the opposite direction of the hook, as set forth.

2. A knife for cutting oil-cloth, consisting of the blade A, provided at its forward end with a hook, having a cutting-edge within said hooked portion, and also formed with the straight guide-edge $a$, the lower outer edge of the hook and the guide-edge $a$ being in alignment, as set forth, whereby the point of the hook is prevented from cutting a carpet or floor upon which the oil-cloth to be cut is laid.

ALFRED S. SEAMAN.

Witnesses:
 SAMUEL FRACK,
 JACOB G. RODRÜAN.